US005685640A

United States Patent [19]

Goedicke et al.

[11] Patent Number: 5,685,640

[45] Date of Patent: Nov. 11, 1997

[54] FLY ASH DOSING METHOD FOR DOSING AND DEVICE THEREFOR

[75] Inventors: Frank Goedicke, Niederhelfenschwil; Wilhelm Herzmann, Hockenruck; Arthur Ruf, Schwerzenbach, all of Switzerland

[73] Assignee: Bühler AG, Uzwil, Switzerland

[21] Appl. No.: 676,911

[22] Filed: Jul. 8, 1996

Related U.S. Application Data

[63] Continuation of Ser. No. 284,561, Oct. 11, 1994, abandoned.

[30] Foreign Application Priority Data

Jan. 25, 1993 [CH] Switzerland ............................. 201/93

[51] Int. Cl.$^6$ ............................ B01F 13/02; G05D 11/02

[52] U.S. Cl. .................. 366/107; 366/152.1; 366/154.1; 34/364; 34/579; 222/195; 406/138

[58] Field of Search .................................... 366/101, 106, 366/107, 152.1, 154.1; 422/139, 143, 145; 34/360, 364, 576, 579, 585, 591; 406/136–138; 222/195

[56] References Cited

U.S. PATENT DOCUMENTS

| | | | |
|---|---|---|---|
| 3,062,414 | 11/1962 | Morris | 222/195 X |
| 3,349,500 | 10/1967 | Wall | 34/364 |
| 3,485,535 | 12/1969 | Fabre | 406/138 X |
| 3,499,577 | 3/1970 | Nilsson | 222/195 X |
| 3,563,610 | 2/1971 | Speegle . | |
| 3,752,446 | 8/1973 | Watanabe . | |
| 4,226,835 | 10/1980 | Beranek etal. | 422/143 X |
| 4,239,421 | 12/1980 | Krauss | 222/195 X |
| 4,330,502 | 5/1982 | Engstrom | 422/143 X |
| 4,336,227 | 6/1982 | Koyama et al. | 422/139 X |
| 4,421,523 | 12/1983 | Mehta etal. | 34/364 X |
| 5,469,994 | 11/1995 | Reh et al. | 366/101 X |

FOREIGN PATENT DOCUMENTS

| | | | |
|---|---|---|---|
| 0168614 | 1/1986 | European Pat. Off. . | |
| 1432010 | 2/1966 | France . | |
| 2125234 | 9/1972 | France . | |
| 260477 | 9/1988 | German Dem. Rep. | 406/136 |
| 1057425 | 5/1959 | Germany . | |
| 2020428 | 12/1970 | Germany . | |
| 58-24710 | 2/1983 | Japan | 34/579 |

*Primary Examiner*—Charles E. Cooley
*Attorney, Agent, or Firm*—Martin A. Farber

[57] ABSTRACT

A method for dosing and particularly for mixing substances, particularly for mixing at least one granular or powdery solid matter with a liquid. A first substance, particularly the granular or powdery solid matter is liquidized by means of a gas fed continuously or pulsatingly, and after that this homogenized gas/matter mixture is brought together in a time stable, dosed manner and mixed with a second substance, particularly a liquid. For dosing the homogenized gas/matter mixture, there is additionally supplied to it gas prior to the mixing with the second substance, with this gas being supplied to the gas/matter stream in a sheathing way and parallel to its direction of flow.

16 Claims, 1 Drawing Sheet

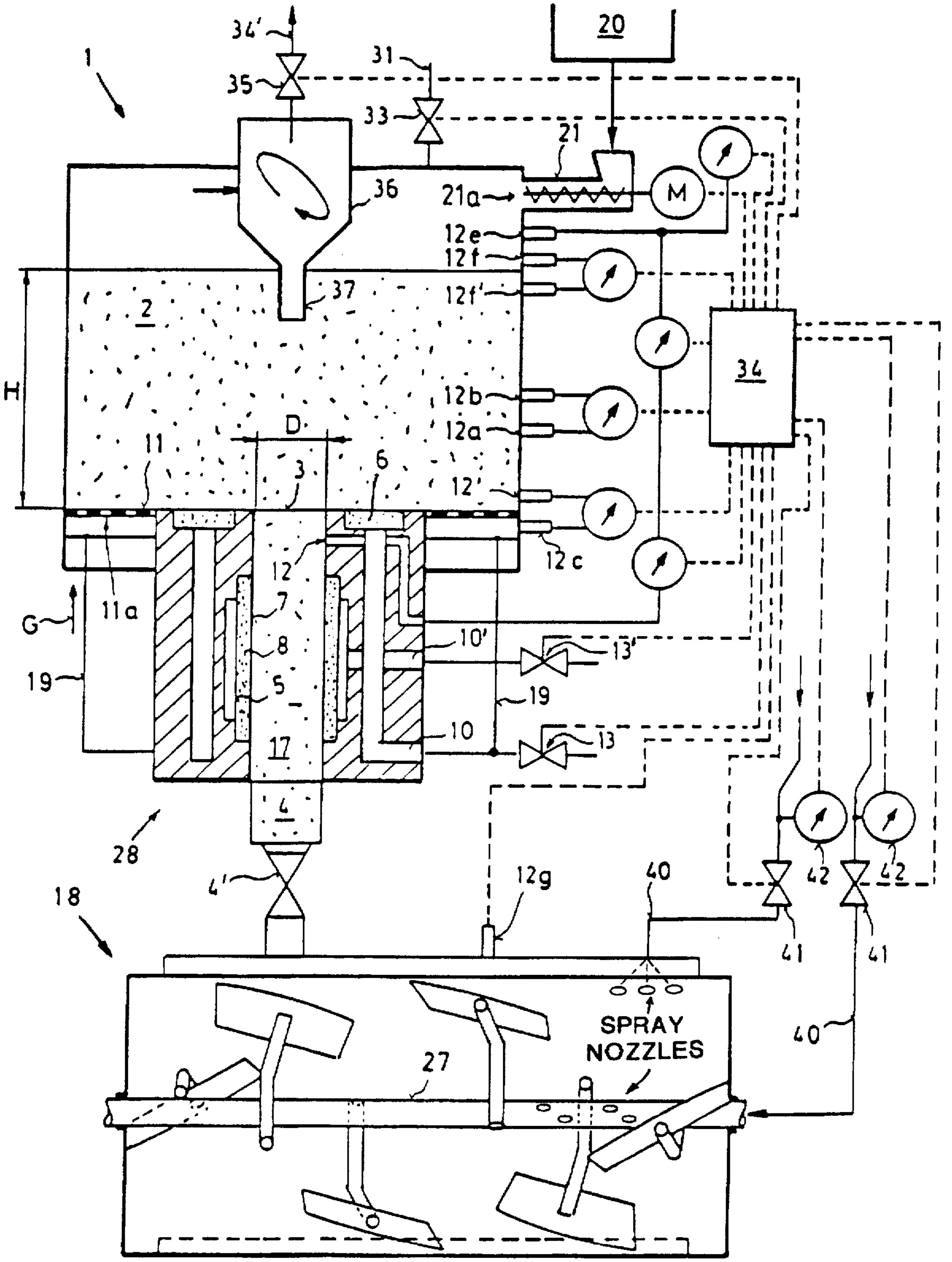
SPRAY
NOZZLES

FLY ASH DOSING METHOD FOR DOSING AND DEVICE THEREFOR

RELATED APPLICATION

This application is a continuation of my application Ser. No. 08/284,561 filed Oct. 11, 1994, now abandoned.

FIELD AND BACKGROUND OF THE INVENTION

The invention relates to a method for dosing particulate or pulverized material using a fluidized bed, in general, and more particularly for mixing at least one granular or powdery solid matter with a liquid, and a device for carrying out this method.

In many applications, such as with blends, it is important that an amount as accurate as possible of a substance or an accurate supply ratio of substances to be mixed with each other is maintained.

In many cases, this problem can be solved with the help of a volumetric dosing, with which volume units of a predetermined size are fed to a mixing device. However, a volumetric dosing is inaccurate if the bulk density of the solid matter to be mixed is very different.

Now, a weight feeding is also conceivable in principle. But it presupposes that the mass is present in toto as a bulk, yet this in turn complicates the mixing, particularly with substances which tend to lumping in the case of addition of a liquid, such as with fly ash. It is true that also the use of continuous balances would be conceivable, but it is known that the accuracy of such balances is just very limited, in particular because the instantaneous mass flow may be subjected to unforeseen fluctuations in their outlets, e.g. by changing the bulk density of the solid matter. But also with balances a careful dosing is required, since the respective substance can generally be added, but hardly removed any longer. By variation of the bulk density of the solid matter, the instantaneous mass flow may additionally be subjected to unforeseen fluctuations in the outlet.

It is true that the use of liquidized beds for dosing is known per se. In those cases, a solid matter is allowed to overflow from the upper side of a liquidized layer. However, this does not result in time stable dosing because gas bubbles mostly develop within the liquidized bed and partly also the solid substances make uncontrolled movements.

SUMMARY OF THE INVENTION

Therefore, it is an object of the invention to provide an accurately dosing method and a device for this. In particular, a mixing system is to be provided for the admixing of at least one liquid to at least one solid matter, wherein these are brought into contact in a predetermined proportion and are intensely mixed.

According to the invention the particulate or pulverized material is drained off the bottom area of the fluidized bed.

For it has been found that the irregularities in a liquidized layer mentioned above which impair a time stable dosing are not present over the entire height of a liquidized layer, but that the bottom remains largely unaffected by this.

An especially important application and modification of the method according to the invention is adding and mixing at least one second material to, respectively with the particulate or pulverized material drained off the fluidized bed as a homogenized mixture of gas and material, and the second material is particularly a liquid and preferably is sprayed onto the material. For the mixing becomes particularly homogenous if all parts of the surface of each particle are laid bare due to the liquidizing in the liquidized bed. Just with a liquid, particularly homogenous mixtures will also develop when the solid matter is difficult to mix and tends to lumping or caking. Thus, particularly favorable preconditions for the mixing of substances difficult to mix with other substances exist, as it is especially given with mixtures with liquids. Within the scope of the invention, dosing devices according to the invention can be provided for all involved components of a mixture prior to the mixing device.

According to a preferred embodiment of the invention, it is suggested that the liquid is injected into the liquidized substance. It has turned out that by this step an optimum mixing with the liquidized substance is achieved.

For an economical and effective dosing, it is suggested in a further modification of the invention that gas is added to the homogenized gas/matter mixture prior to mixing with the second substance, with this gas being added to the gas/solid matter stream in a sheathing manner and parallel to its flow direction. By optional change of this additional gas supply, a more or less marked "dilution" of the two-phase mixture from the liquidized bed is achieved.

A particularly effective and thus precise dosing is achieved according to a further preferred embodiment of the invention if the speed of the additionally supplied gas sheathing the gas matter mixture stream is provided as great as the speed of the gas/matter mixture stream.

In a device provided by the invention for carrying out the method, it is suggested that a liquidized bed apparatus for liquidizing the first particularly granular or powdery solid substance is provided, which has an inlet for the first substance, one or more inlet openings, preferably at the bottom of the liquidized bed apparatus, for gas for fluidizing, an an outlet opening for the liquidized gas/solid matter mixture, that on the outlet opening one is provided which ends in a mixing device, to which also the second substance, particularly in liquid form is supplied, preferably via spraying nozzles or the like. This device provided by the invention allows to carry out the steps of the method according to the invention with low constructional expenses and to provide the preconditions for the mixing of the substances difficult to mix with each other.

The dosing according to a preferred embodiment of the invention can be effected in a particularly effective manner if on the outlet opening of the liquidized bed apparatus, or in the area of the outlet line, respectively, a nozzle unit preferably designed as a hollow body is provided as a dosing device for the mixing procedure, which has channels for the introduction of additional gas through a porous wall, nozzles, etc. of the hollow body into or to the homogenous gas/matter mixture.

If it is necessary in connection with a working process that the mixing and dosing is controlled in an automatic manner, then it is suggested for it according to a preferred embodiment of the invention that for measuring the matter contents of the liquidized gas/matter mixture the liquidized bed apparatus and the nozzle unit are provided with measuring elements spaced apart from each other, if required, with preferably electrical or electronic pressure measuring devices or level sensors, whose output signals are applied to a stored-program electronic control unit whose output signals are applied to the liquidized bed apparatus for its control, preferably from a conveying installation for supplying the first substance.

The dosing device described suffices to correct minor deviations by gasing; in order to correct greater deviations, it is suggested in a further modification of the invention that the liquidized bed apparatus can be biased with a, particularly preselectable, gas pressure for a valve controllable by the stored-program control unit.

BRIEF DESCRIPTION OF THE DRAWINGS

Further details of the invention are revealed by the following description of an embodiment represented in the only FIGURE of the drawing which is a schematic view of the invention partly in section.

DETAILED DESCRIPTION OF THE PREFERRED EMBODIMENT

According to the representation, solid matter in the form of particles, e.g. fly ash or another granular or powdery material particularly tending to lumping is fed into a liquidized bed apparatus 1 from a preceding plant part 20 via a conveying installation, such as a screw 21 or a pneumatic conveyor. The preceding plant part may consist of a storage container or a separating or conveying system, by way of example, as it is described in the EP-A-0 168 614. A loosening installation (not represented) provided in the outlet area of the storage container 20 can ensure outflowing of the solid matter particles—as it is common with storage bins—even with varying fill heights in the storage container 20. For a conveyance of the particles as poor in abrasion as possible, particularly a pneumatic dense stream conveyance may be selected, as it is also suggested in the case of the EP-A-0 168 614. The place of the inlet 21*a* of the solid matter particles is conveniently preselected in such a manner that the impulse forces of the solid matter particles fed from the conveyor 21 into the liquidized layer 2 can be neglected.

Through the bottom 11 permeable to the gas (or also to a vapor) and therefore generally provided with inlet openings 11*a* of the liquidized bed apparatus 1, liquidizing gas G flows from a line 19 from below to the top, whirling up the fed-in solid matter particles under formation of a liquidized layer 2. This liquidizing bottom 11 can be designed as a perforated bottom, but a bottom made up of porous material would also be conceivable. In the case of intended mixtures, the gas can also already be formed of the vapor of the liquid to be supplied, possibly only for achieving a prewetting. With increasing flow speed of the gas, the layer loosens up more and more, so that the solid matter particles perform smaller and larger changes of place. From a determined flow speed onward, in which a bulk layer changes into a liquidized layer (loosening point), the pressure drop in the layer over its height is approximately constant, which—as described below—can be used for a better mastery of the dosing.

Theoretically, the area of the liquidized layer extends from the lower limit speed, the loosening speed, up to a higher limit speed, which can be characterized by the fact that the layer is loosened up so much that each individual particle hovers, unaffected by an adjacent one, in the liquid stream.

If liquidized solid matter is now to be conveyed off in a timestable, dosed manner from such a liquidized layer 2, this can only occur in a meaningful way from a liquidized layer as homogenous as possible. It has become apparent that this condition can be met in a better way than up to now by arranging an outlet opening 3 in the area of a bottom 11, yet that it is distinctly improved by the introduction of a gas stream G with gas speeds common with such liquidized beds. For only then will the solid matter particles remain distributed also in a very constant way in the liquidized layer volume to be drawn off; in an ideal case, there occur no bounding forces between the particles.

The gas/solid matter mixture of the liquidized layer 2 largely behaves like a liquid; via the outlet opening 3 in the bottom 11 of the liquidized bed apparatus 1, the gas/solid matter mixture 17 present in the liquidized layer 2 in a homogenous form can "flow out" into the outlet line 4.

Now, if a gas/solid matter mixture 17 homogenous to a large degree is present, in which the individual particles are on an average equally spaced apart from each other, it has been found that particularly favorable preconditions for the mixing of substances difficult to mix with other substances, particularly liquids, are given. It has already been mentioned above that the pressure drop over the height of the liquidized layer 2 is constant, so that pressure differences can be used as a measure for the amount of the solid substances contained in the liquidized layer. Thus, it is not only possible to determine the amount of the solid matter present accurately in a quantitative manner, but also to maintain the homogeneity of the gas/solid matter mixture and even to increase it, i.e. to meet a qualitative condition which offers an optimum solution approach to the problem posed.

All gas amounts supplied to the liquidized bed apparatus 1 leave it via an exhaust line 34', in which a valve 35 for adjusting the pressure in the liquidized bed apparatus 1 can be integrated. If required, an installation for the precleaning or cleaning of the exhaust air can also be built in, which can be particularly a centrifugal separator (cyclone) 36, but, if necessary, also a deflection sifter, with the solid matter deposited being again supplied to the liquidized bed 2 via an extended standpipe 37.

For controlling the solid matter contents of the liquidized layer 2, a differential pressure measurement is advantageously provided between a pressure measuring element 12' immediately above the liquidizing bottom 11 and a further pressure measuring element 12*e* above the liquidized layer 2. If required, the pressure difference between sensors 12*f* and 12*f* and/or 12' can also be used for determining the amount of solid matter in the liquidized layer 2. Even though these methods present themselves in a liquidized bed, using the particular conditions, the present invention is not limited to this kind of measurement of the solid matter contents; it could rather be determined also in another manner, e.g. by weighing cells, on which the entire liquidized bed apparatus 1 is mounted.

Now, to remove the homogenous gas/solid matter mixture from the liquidized bed apparatus 1 as a mass flow subjected to only minimal uncontrolled fluctuations even in short time intervals, there is provided in its bottom 11 at least one, conveniently centrally arranged, nozzle installation 28 at the outlet opening 3. To each nozzle 28 there is assigned an outlet line 4, which can be provided with a closing element 4'. By supplying further gas, there is influenced the density of the solid matter stream in the two-phase mixture, thereby enabling an accurate dosing. In doing this, the speed of the gas (which can be a different one from the one in the liquidized bed, e.g. the vapor mentioned of the liquid to be admixed) supplied via the nozzle 28 is conveniently substantially the same as the speed of the gas/solid matter mixture flowing through the outlet opening 3.

Since, as described above, the quality of the dosing of the outflowing solid matter is very largely determined also by the homogeneity of the outflowing gas/solid matter stream, any possible sources of instability are to be eliminated already in the liquidized layer 2 by respective measures. Thus, it is possible, by way of example, by favorable design of the liquidized bed bottom 11 to increase the instability limit. If, e.g. highly porous sinter bottoms are selected having a medium pore diameter of 25 μm and a bottom thickness of about 20 mm, then the liquid flows into the liquidized layer in a finely distributed way. Oscillatory liquidized bed bottoms 11, which can be set vibrating by a pulser, if required, support this procedure. In the same way, the use of stirrers is also possible. Liquidizing gas (or liquidizing vapor), which flows in trough the bottom 11 of the liquidized bed apparatus 1 in a pulsating way, also improves—if necessary, additionally to the measures described—the homogeneity of the liquidized layer 2.

The not unproblematic area of the entry zone is determined by the ratio of the diameter D of the outlet opening 3 and the height H and/or the bottom surface of the liquidized layer 2—with the liquidizing speed remaining the same. Thus, a ratio of D:H of 1:2 turns out to be a convenient minimum requirement. The higher the height of the liquidized layer H—and thus the solid matter contents—becomes against the diameter D of the outlet opening 3, the better is the homogeneity of the liquidized layer 2, and thus the prehomogenizing of the outflowing gas/solid matter stream. Greater heights of the liquidized layer H additionally act on fluctuations in a dampening manner, which can develop due to the supply of the solid matter particles into the liquidized layer via the conveying installation 21, by way of example.

Furthermore, one or a plurality of liquidizing nozzles 6 can be arranged symmetrically to the outlet opening 3, via which liquidizing nozzles liquidizing gas is brought into the liquidized layer 2 in addition to the gas (arrow G) flowing through the bottom 11 of the liquidized bed apparatus 1. Here, the liquidizing nozzle 6 is designed in the form of a ring channel with a porous insert, whereby the outlet opening 3 can be additionally liquidized in a concentrical way. The possibility is thereby created to counterbalance to a certain degree the formation of instabilities, which are a characteristic feature of particularly the entry zone. Also it has turned out that in such a manner pulling in of bubbles into the outlet line 4 is impaired. Therefore, the speed of the gas additionally added via the liquidizing nozzle 6 ought to be preferably smaller than the speed of the gas flowing through the bottom 11 of the liquidized bed apparatus 1. Solid matter bridges, which preferably form especially within the area of the outlet opening 3, can thus be broken up and dissolved.

The mass flow of the solid matter flowing out is substantially determined by the mass of the solid matter which is just in the liquidized bed 2, and by the pressure difference between a point above the liquidized layer 2 and a point in the plant part immediately succeeding the outlet line 4, and is substantially established by evaluating these data. It can be influenced as follows:

An approximate preadjustment of the outflowing solid matter mass stream is effected above the liquidized layer 2 via the solid matter contents of the liquidized layer 2 and/or via an increase or decrease in pressure. In doing so, the solid matter contents are determined, as represented above, and adjusted via a control unit 34, which acts on the supply of solid matter into the liquidized layer 2 via the conveying installation 21.

Now, it is particularly advantageous if with the help of the pressure measuring element 12*e* the pressure in the area above the liquidized layer 2 is determined and adjusted via the, e.g. stored-program, control unit 34 by actuating a valve 35 in the exhaust line 34 of the liquidized bed apparatus 1 and/or via a valve 33 in a line 31 by adjusted addition of a gas being on a higher pressure level (it may be the same as the liquidizing gas or a different one). But instead of using the pressure at the sensor 12*e*, the pressure difference between this sensor 12*e* and a pressure measuring element 12*g* located in the succeeding installation part, such as in a mixer 18, can also be used for this purpose, which is particularly recommendable if the pressure in this installation part or the mixer 18 is subjected to changes determined by the method.

Now, if the gas supply 5, 8 already mentioned is provided as possibly immediately succeeding the outlet opening 3, then an influence of the solid matter mass throughput with extremely low reaction times can be achieved. In principle, it can be realized by individual nozzles, e.g. arranged in a coronal manner on the line 4, but it is advantageously designed as a cylindrical gas-permeable hollow body 5, e.g. of a ceramic material, which is surrounded by an annular gasing channel 8. It is also supplied with liquidizing gas via a gas line 10', which can be connected to the liquidizing nozzles 6 via the gas line 10, in which case there may be provided valves 13,13', optionally also directional valves and/or pressure reducing valves.

For measuring the exiting gas/solid matter stream, there can be provided a pressure measuring element 12 located as close to the outlet opening 3 in the wall 7 of the hollow body 5 as possible, via which, along with a pressure measuring element 12' arranged close to the bottom 11 of the liquidized bed apparatus 1, the pressure difference between the liquidized layer 2 near the bottom and the outlet line 4 near the outlet opening 3 is determined, in which arrangement a piezoresistive differential pressure detector or two individual piezoresistive differential pressure detectors may be provided for this purpose. By this positioning of the pressure measuring elements 12, 12' there is achieved that the delay time between the entry of the solid matter into the outlet opening 3 and the measurement of the solid matter mass stream via the pressure measuring elements 12, 12' is minimized.

Of course, this measurement could also be realized by another measuring method, e.g. according to the Coriolis principle, which, however, would result in an undesired influence of the solid matter mass stream relative to throughput and homogeneity.

The measuring data available via the differential pressure measurement can be led via the control unit 34 already mentioned having an in-built controller, which control unit 34 in its turn controls the liquidizing and/or gasing of the outflowing gas/solid matter stream via the gasing channel 8 and/or the liquidizing nozzle(s) 6, thereby enabling a control of the gas/solid matter stream.

The supply of additional liquidizing gas necessary for influencing the solid matter mass throughput here amounts to only a fraction of the total of liquidizing gas, whereby extremely fast regulation and control times of less than 100 milliseconds become possible.

The provision of further pressure measuring elements 12*a* to 12*e* on the one hand enables the control of the porosity and homogeneity of the liquidizing layer 2 via a differential pressure measurement within the liquidizing layer 2 (12*a* and 12*b*). On the other hand, via the pressure measuring elements 12' and 12*c*, which are arranged immediately above and immediately below the bottom 11 of the liquidizing bed apparatus 1, there can be measured a pressure drop above the bottom 11, so that any possible obstructions of the porous bottom 11 can be detected in time.

To avoid that fine solid matter can deposit from the liquidizing layer 2 onto the measuring membranes of pressure sensors, there are provided preferably small, fine, porous plastic filters, or by rinsing of the pressure line with gas, respectively, the introduction of solid matter particles will be avoided.

Measuring data obtained on the basis of measurements of the homogeneity in the liquidizing layer 2 can serve as a regulative for the homogenizing of the liquidizing layer 2, on the one hand, or of the outflowing gas/solid matter stream, on the other hand, both via a readjustment of the flow speed of the liquidizing gas and via the supply of additional liquidizing gas, be it via the liquidizing nozzles 6, the liquidizing bottom 11 and particularly via the gas supply line 5, 8.

Thus, to achieve the desired dosing accuracy and dosing speed, there are provided a plurality of regulating or control mechanisms, whose combination or separate application effect a great control area and excellent control characteristics.

Thereby, good preconditions are given for the accurately dosed mixing of a solid matter difficult to mix with a liquid, by the fact that, on the one hand, the amount of solid matter can be determined accurately, and that, on the other hand, it is present in particularly favorable preconditions for the mixture. Therefore—as a third precondition for solving the problem underlying the invention—there is provided a mixing device 18 succeeding the liquidizing and dosing device comprising the liquidizing bed 1, which mixing device 18 is represented just symbolically here and which can be designed in the most diverse manner, in principle. E.g. the liquidized bed 1 can be filled up and discharged batchwise into a mixing device 18 working in batch operation until the height H is reached (which, by means of the sensors, is detected in the manner described).

The liquid(s) to be admixed is/are supplied to the system via lines 40 to at least one place. In particular, the supply of one and the same liquid to different places is also possible. In such a case, the liquid can be injected into the liquidized solid matter via spraying nozzles, e.g. also via a hollow mixing shaft 27 and/or in liquid or vapor-shaped form directly into the liquidizing layer and/or into the nozzle 28, if required, also only for the prewetting.

In a liquid line 40, of which two variants to be applied alternatively or cumulatively are shown, appropriate devices are provided for a purposeful change of the throughput, e.g. a control valve 41 and/or a pump, as well as for the measurement of the amount of liquid added (measuring device 42), which can be designed differently, e.g. in the form of a magnetic-inductive throughput measuring device, an ultrasound measuring device or the like. It is possible to operate these througput measuring devices also just temporarily, e.g. to adjust a basic adjustment. Via the measured throughputs of liquid and solid matter, there is also carried out a control of the amount of liquid according to the requirements of the operation, e.g. by influencing the control valve 41.

As mentioned above, the mixing device can be designed in the most diverse manner. The application of a batch operation in the case of fly ash is favorable for the reason that fly ash is withdrawn in practice in temporarily very different amounts.

Although the invention has been described on the basis of a mixing device 18, which can be designed in different ways per se, it is also well possible to apply it in another context, e.g. for the dosing in balances. Furthermore, numerous modifications are conceivable even on the device shown; for example for the control of the pressure difference between a point above the liquidized layer 2 and the mixing element 18, a valve 33 may be integrated into the exhaust line 31 of the liquidized bed apparatus 1, which valve 33 is controlled via the pressure difference at the measuring elements 12*f* and 12*g*.

What is claimed is:

1. A method for dosing material which is particulate or pulverized by use of fluidizing apparatus comprising a chamber holding a fluidized bed and having an outlet nozzle assembly, the method comprising steps of:

draining said material off a bottom area of said fluidized bed;

conducting said material into a mixer;

feeding a substance into said mixer via supply means;

mixing said material with said substance in said mixer;

supplying a further gas, in addition to a gas of the fluidized bed, to said material prior to said mixing step for accomplishing a dosing of said material with said further gas;

measuring a solid content of the fluidized bed at plural sites of measurement in said fluidizing apparatus to obtain a measure of the solid content;

using measurements attained at the plural measurement sites to control a flow rate of said further gas into the fluidized bed; and adjusting a rate of feeding of the substance into said mixer in said feeding step relative to a rate of the conducting of the material into said mixer in response to the measure of the solid content to make the rate of feeding the substance into the mixer proportional to the rate of conducting the material into the mixer.

2. A method as claimed in claim 1, wherein, in said feeding step, said substance is a liquid, and in said measuring step, said measuring includes using a measurement device which is an electrical pressure measurement device or a fluid level sensor.

3. A method as claimed in claim 2, wherein, in said supplying step, said further gas is supplied circularly around said material; and before said step of feeding said substance and, in said step of supplying said further gas, said further gas is supplied parallel to a flow direction of a fluidized mixture of the fluidized bed and with a speed equal to a speed of flow of the mixture of the fluidized bed.

4. Apparatus including a fluidized bed for dosing particulate material treated in the fluidized bed, wherein the material is drained from a bottom area of the fluidized bed after treatment of the material, the apparatus comprising:

a fluidizing assembly comprising a chamber holding the fluidized bed, and an outlet nozzle assembly at a bottom of the fluidized bed;

a first inlet for admitting the particulate material to the fluidized bed, and a second inlet for admitting a gas to the fluidized bed, the second inlet comprising a gas permeable bottom of said chamber;

mixing means disposed downstream of said outlet nozzle assembly for receiving contents of the fluidized bed, said mixing means including means for supplying a further substance into said mixing means;

means responsive to a flow rate of the particulate material through said fluidizing assembly for regulating a rate of flow of the further substance into said mixing means relative to a rate of flow of the particulate material through said fluidizing assembly to make the substance flow rate proportional to the material flow rate; and wherein said mixing means is operative to mix the contents of the fluidized bed, as outputted by said nozzle assembly, with said further substance;

said nozzle assembly includes a gas admission port for dosing the particulate material in the fluidized bed prior to a mixing of the contents of the fluidized bed in said mixing means; and the apparatus is operative to create a two-phase mixture of the particulate material and a gas prior to the mixing of the contents of the fluidized bed in said mixing means.

5. An apparatus as claimed in claim 4, further comprising measuring means for measuring the content of particulate material within the two-phase mixture, said measuring means having a plurality of pressure sensors located at plural locations in said fluidizing assembly, said regulating means being responsive to a measurement of said measuring means.

6. An apparatus as claimed in claim 4, further comprising a discharge line leading from said outlet nozzle assembly to said mixing means for mixing said particulate material discharged from said chamber with said further substance.

7. An apparatus as claimed in claim 6, wherein said gas admission port of said outlet nozzle assembly comprises at least one porous gas injection area for injecting gas to a homogenized mixture of the fluidized bed and gas supply channels for supplying said gas injection area with gas, said outlet nozzle assembly having the shape of a hollow body.

8. An apparatus as claimed in claim 7, further comprising:

measuring means for measuring the content of fluidized material of said fluidized bed, said measuring means including a measuring element located at said outlet nozzle assembly;

process control means, and valves connected to said measuring means, said process control means serving for controlling said valves to attain a variation in flow, said individual valves serving to feed said further substance to said mixing means; and wherein said measuring element is an electric pressure sensor or level sensor, and said process control means comprises a programable electric memory.

9. An apparatus as claimed in claim 8, wherein a further one of said valves, under, control of said process control means, serves to supply to the fluidized bed a pressurized gas, a pressure of the gas being selectable by the process control means.

10. An apparatus as claimed in claim 8, wherein said mixing means includes spray nozzle means;

said measuring element includes a pressure sensor at said chamber for sensing a pressure of said fluidized bed, said further substance is a liquid; and the apparatus further comprises liquid control means including a plurality of said valves, said liquid control means being controllable by the process control means, said process control means being connected to said pressure sensor at said chamber, and the liquid control means controlling a flow of liquid into said spray nozzle means of said mixing means.

11. An apparatus as claimed in claim 7, further comprising:

measuring means for measuring the content of fluidized material of said fluidized bed, said measuring means including a measuring element located at said outlet nozzle assembly;

process control means, and valves being connected to said measuring means, said process control means serving for controlling said valves to attain a variation in flow, said individual valves serving to feed said further substance to said mixing means; and wherein said measuring element is an electric pressure sensor or level sensor, and said process control means comprises a programable electronic memory.

12. An apparatus as claimed in claim 11, wherein a further one of said valves, under control of said process control means, serves to supply to the fluidized bed a pressurized gas, the pressure of the gas being selectable by the process control means.

13. An apparatus as claimed in claim 11, wherein said mixing means includes spray nozzle means;

said measuring element includes a pressure sensor at said chamber for sensing a pressure of said fluidized bed, said further substance is a liquid; and the apparatus further comprises liquid control means including a plurality of said valves, said liquid control means being controllable by the process control means, said process control means being connected to said pressure sensor at said chamber, and the liquid control means controlling a flow of liquid into said spray nozzle means of said mixing means.

14. An apparatus as claimed in claim 7, further comprising:

measuring means for measuring the content of fluidized material of said fluidized bed, said measuring means including a measuring element located at said outlet nozzle assembly;

process control means having flow variation means, said flow variation means serving to control a flow of said further substance to said mixing means; and wherein said measuring element is an electric pressure sensor or level sensor, and said process control means comprises a programable electronic memory.

15. An apparatus as claimed in claim 14, wherein said flow means serves to supply to the fluidized bed a pressurized gas, a pressure of the gas being selectable by the process control means.

16. An apparatus as claimed in claim 14, wherein said mixing means includes spray nozzle means;

said measuring element includes a pressure sensor at said chamber for sensing a pressure of said fluidized bed, said further substance is a liquid; and the apparatus further comprises liquid control means including a plurality of valves, said liquid control means being controllable by the process control means, said process control means being connected to said pressure sensor at said chamber, the liquid control means controlling a flow of liquid into said spray nozzle means of said mixing means.

* * * * *